United States Patent
Bruhn et al.

(10) Patent No.: US 12,049,837 B2
(45) Date of Patent: Jul. 30, 2024

(54) METHOD FOR CHECKING OPERABILITY, CHECKING DEVICE AND MOTOR VEHICLE

(71) Applicant: Bayerische Motoren Werke Aktiengesellschaft, Munich (DE)

(72) Inventors: Andreas Bruhn, Puchheim (DE); Jens Brunner, Unterhaching (DE); Markus Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/924,872

(22) PCT Filed: Apr. 20, 2021

(86) PCT No.: PCT/EP2021/060173
§ 371 (c)(1),
(2) Date: Nov. 11, 2022

(87) PCT Pub. No.: WO2021/228509
PCT Pub. Date: Nov. 18, 2021

(65) Prior Publication Data
US 2023/0212972 A1    Jul. 6, 2023

(30) Foreign Application Priority Data
May 14, 2020 (DE) .................. 10 2020 113 091.0

(51) Int. Cl.
*F01N 11/00* (2006.01)
*F01N 3/20* (2006.01)
*G01F 25/20* (2022.01)

(52) U.S. Cl.
CPC ............ *F01N 11/00* (2013.01); *F01N 3/2066* (2013.01); *G01F 25/24* (2022.01);
(Continued)

(58) Field of Classification Search
CPC ................ F01N 11/00; F01N 2550/05; F01N 2610/02; F01N 2610/1453;
(Continued)

(56) References Cited

U.S. PATENT DOCUMENTS

| | | |
|---|---|---|
| 9,255,515 B2 | 2/2016 | Barbier et al. |
| 2013/0276429 A1 | 10/2013 | Barcin et al. |
| 2015/0204930 A1 | 7/2015 | Sykes |
| 2018/0283929 A1* | 10/2018 | Mueller ............... F01N 3/2066 |
| 2019/0195112 A1 | 6/2019 | Negishi et al. |

FOREIGN PATENT DOCUMENTS

| | | |
|---|---|---|
| DE | 10 2008 042 763 A1 | 4/2010 |
| DE | 10 2011 078 870 A1 | 7/2012 |
| DE | 10 2011 078 161 A1 | 9/2012 |

(Continued)

OTHER PUBLICATIONS

International Search Report (PCT/ISA/210) issued in PCT Application No. PCT/EP2021/060173 dated Jul. 27, 2021 with English translation (six (6) pages).

(Continued)

*Primary Examiner* — Sizo B Vilakazi
*Assistant Examiner* — Diem T Tran
(74) *Attorney, Agent, or Firm* — Crowell & Moring LLP

(57) ABSTRACT

A method for checking operability of a first metering unit includes sending a control signal to a second metering unit to dispense a second quantity; comparing the quantity dispensed with the second quantity; sending a control signal to a second metering unit to introduce a third quantity; detecting the pressure drop caused by the introduction of the third quantity; sending a control signal to the first metering unit to introduce a first quantity; detecting the pressure drop caused by executing the control signal to introduce the first quantity; and ascertaining that the first metering unit is not functioning correctly if a difference between the pressure drop detected as a result of the execution of the control (Continued)

signal to introduce the first quantity and the pressure drop detected as a result of the execution of the control signal to introduce the third quantity is above a threshold.

10 Claims, 2 Drawing Sheets

(52) U.S. Cl.
CPC ...... *F01N 2550/05* (2013.01); *F01N 2610/02* (2013.01); *F01N 2610/1453* (2013.01); *F01N 2610/146* (2013.01); *F01N 2900/1808* (2013.01); *F01N 2900/1822* (2013.01)

(58) Field of Classification Search
CPC ....... F01N 2610/146; F01N 2900/1808; F01N 2900/1822; F01N 3/2066; G01F 25/24; Y02A 50/20; Y02T 10/12; Y02T 10/40
See application file for complete search history.

(56) References Cited

FOREIGN PATENT DOCUMENTS

| | | |
|---|---|---|
| DE | 10 2011 076 955 B4 | 5/2013 |
| DE | 10 2012 213 525 A1 | 2/2014 |
| DE | 10 2012 206 430 B4 | 10/2015 |
| DE | 10 2014 210 877 A1 | 12/2015 |
| DE | 10 2016 209 832 A1 | 12/2017 |
| DE | 102017205298 * | 10/2018 |
| DE | 10 2018 006 119 A1 | 2/2020 |

OTHER PUBLICATIONS

German-language Written Opinion (PCT/ISA/237) issued in PCT Application No. PCT/EP2021/060173 dated Jul. 27, 2021 (10 pages).

German-language Search Report issued in German Application No. 10 2020 113 091.0 dated Dec. 16, 2020 with partial English translation (10 pages).

* cited by examiner

METHOD FOR CHECKING OPERABILITY, CHECKING DEVICE AND MOTOR VEHICLE

BACKGROUND AND SUMMARY OF THE INVENTION

The technology disclosed here relates to a method for checking the operability of a first metering unit, to a checking device and to a motor vehicle.

Many motor vehicles have a plurality of metering units, e.g. injection nozzles, for introducing an operating medium, e.g. water or AdBlue®, into a line and/or into the combustion chamber of the engine. One problem often encountered in doing so is that one of the metering units is installed at a location in the engine compartment of the motor vehicle where it can be removed and checked for operability only with difficulty. Therefore, it is technically difficult to check the metering units for operability.

One preferred object of the technology disclosed here is to reduce or to eliminate at least one disadvantage of a solution that is already known or to propose an alternative solution. In particular, a preferred object of the technology disclosed here is that of disclosing a method and, respectively, a checking device by way of which a metering unit of a metering system for introducing an operating medium in a motor vehicle can be checked for operability in a technically simple manner. Further preferred objects can be seen in the advantageous effects of the technology disclosed here. The object(s) is/are achieved by the subject matter of the claimed invention.

In particular, the object is achieved by a method for checking the operability of a first metering unit for introducing an operating medium into a line and/or into a combustion chamber of an engine of a motor vehicle, wherein the first metering unit is part of a metering system, wherein the metering system further has a second metering unit for introducing the operating medium into a line and/or into the combustion chamber of the engine, wherein the method comprises the following steps: sending a control signal to the second metering unit to dispense a second specified quantity of operating medium; detecting the quantity of operating medium actually dispensed by the second metering unit in response to the control signal to dispense the second specified quantity of operating medium; comparing the quantity of operating medium actually dispensed by the second metering unit with the second specified quantity of operating medium to check the operability of the second metering unit; sending a control signal to the second metering unit to introduce a third specified quantity of operating medium; detecting the drop in pressure in the operating medium in the metering system owing to the introduction of the third specified quantity of operating medium and/or the number of pumping cycles which are carried out by a pump to supply operating medium to the second metering unit in conjunction with the introduction of the third specified quantity of operating medium by the second metering unit; sending a control signal to the first metering unit to introduce a first specified quantity of operating medium; detecting the drop in pressure in the operating medium in the metering system owing to the execution of the control signal to introduce the first specified quantity of operating medium by the first metering unit and/or the number of pumping cycles which are carried out by a pump to supply operating medium to the first metering unit in conjunction with the introduction of the first specified quantity of operating medium by the first metering unit; comparing the detected drop in pressure on account of the execution of the control signal by the first metering unit to introduce the first specified quantity with the detected drop in pressure on account of the execution of the control signal by the second metering unit to introduce the third specified quantity and/or the detected drop in pressure on account of the execution of the control signal by the first metering unit to introduce the first specified quantity relative to the first specified quantity with the drop in pressure on account of the execution of the control signal by the second metering unit to introduce the third specified quantity relative to the third specified quantity and/or the number of pumping cycles which are carried out by the pump to supply operating medium to the first metering unit in conjunction with the introduction of the first specified quantity of operating medium by the first metering unit with the number of pumping cycles which are carried out by the pump to supply operating medium to the second metering unit in conjunction with the introduction of the third specified quantity of operating medium by the second metering unit and/or the number of pumping cycles which are carried out by the pump to supply operating medium to the first metering unit in conjunction with the introduction of the first specified quantity of operating medium by the first metering unit in relation to the first specified quantity with the number of pumping cycles which are carried out by the pump to supply operating medium to the second metering unit in conjunction with the introduction of the third specified quantity of operating medium by the second metering unit in relation to the third specified quantity; and establishing that the first metering unit is not operating correctly if a difference between the values which are compared with one another lies above a specified limit value.

One advantage of this is that the metering units, in particular the first metering unit, of the metering system can be checked for operability in a technically simple manner. Therefore, it is possible to check whether the first metering unit is dispensing the quantity of operating medium that it is intended to dispense owing to the control signal, without removing the first metering unit from the engine compartment. The drop in pressure and/or the number of pumping cycles of the pump during introduction at the first metering unit can be checked for plausibility. In this way, the drop in pressure at the first metering unit can be set in relation to or standardized with the quantity of operating medium actually dispensed. Consequently, the first metering unit can be checked for operability in a technically simple manner. Therefore, it is possible to establish whether the first metering unit or the second metering unit has a fault, i.e. is not operating correctly, when there is a large difference between the drops in pressure at the first metering unit and at the second metering unit or in the drops in pressure relative to the first specified quantity and the third specified quantity and/or between the number of pumping cycles of the pump or between the number of pumping cycles relative to the first specified quantity and the third specified quantity. The second metering unit can be subjected to a metering quantity test. If the difference between the measured or detected drops in pressure or the standardized drops in pressure (drop in pressure relative to the specified quantity) and/or between the number of pumping cycles or the standardized number of pumping cycles (number of pumping cycles relative to the specified quantity) is greater than a specified value, it can be established that the first metering unit is not operating correctly since the correct manner of operation of the second metering unit has been checked and this can therefore serve as a reference. In this case, the first metering unit can be replaced or repaired or the control signal to the first metering unit can be adapted in a corresponding manner, so that the desired quantity of operating medium is also actually dispensed by the first metering unit. The first metering unit can be installed close to the engine, in particular closer to the engine than the second metering unit. The second metering unit can be installed in the underfloor region of the engine. The second metering unit can typically be removed more easily than the first metering unit. The first metering unit and the second metering unit are typically connected to a common pump in the metering system.

In particular, the object is also achieved by a checking device for checking the operability of a first metering unit of a metering system, wherein the metering system is designed to introduce an operating medium into a line and/or into a combustion chamber of an engine of a motor vehicle, wherein the metering system further comprises a second metering unit for introducing the operating medium, wherein the checking device is designed to send a control signal to the second metering unit to introduce a third specified quantity of operating medium, to send a control signal to the second metering unit to introduce a second specified quantity of operating medium, to detect the quantity of operating medium actually dispensed by the second metering unit in response to the signal to dispense the second specified quantity, to detect the drop in pressure in the operating medium in the metering system owing to the execution of the control signal to introduce the third specified quantity of operating medium by the second metering unit and/or the number of pumping cycles which are carried out by a pump to supply operating medium to the second metering unit in conjunction with the introduction of the third specified quantity of operating medium by the second metering unit, to send a control signal to the first metering unit to introduce the first specified quantity of operating medium, to detect the drop in pressure in the operating medium in the metering system owing to the execution of the control signal to introduce the first specified quantity of operating medium by the first metering unit and/or the number of pumping cycles which are carried out by a pump to supply operating medium to the first metering unit in conjunction with the introduction of the first specified quantity of operating medium by the first metering unit, to compare the detected drop in pressure on account of the execution of the control signal by the first metering unit to introduce the first specified quantity with the detected drop in pressure on account of the execution of the control signal by the second metering unit to introduce the third specified quantity or the detected drop in pressure on account of the execution of the control signal by the first metering unit to introduce the first specified quantity relative to the first specified quantity with the detected drop in pressure on account of the execution of the control signal by the second metering unit to introduce the third specified quantity relative to the third specified quantity and/or the number of pumping cycles which are carried out by the pump to supply operating medium to the first metering unit in conjunction with the introduction of the first specified quantity of operating medium by the first metering unit with the number of pumping cycles which are carried out by the pump to supply operating medium to the second metering unit in conjunction with the introduction of the third specified quantity of operating medium by the second metering unit, or the number of pumping cycles which are carried out by the pump to supply operating medium to the first metering unit in conjunction with the introduction of the first specified quantity of operating medium by the first metering unit in relation to the first specified quantity with the number of pumping cycles which are carried out by the pump to supply operating medium to the second metering unit in conjunction with the introduction of the third specified quantity of operating medium by the second metering unit in relation to the third specified quantity, and to establish that the first metering unit is not operating correctly if a difference between the values which are compared with one another lies above a specified limit value.

The advantages of the checking device correspond substantially to the abovementioned advantages of the method described above.

In particular, the object is also achieved by a motor vehicle having a checking device of this kind.

The advantages of the motor vehicle correspond substantially to the abovementioned advantages of the method described above.

The values which are compared with one another can be, in particular, the detected drop in pressure on account of the execution of the control signal by the first metering unit to introduce the first specified quantity compared with the detected drop in pressure on account of the execution of the control signal by the second metering unit to introduce the third specified quantity, the detected drop in pressure on account of the execution of the control signal by the first metering unit to introduce the first specified quantity relative to the first specified quantity compared with the drop in pressure on account of the execution of the control signal by the second metering unit to introduce the third specified quantity relative to the third specified quantity, the number of pumping cycles which are carried out by the pump to supply operating medium to the first metering unit in conjunction with the introduction of the first specified quantity of operating medium by the first metering unit compared with the number of pumping cycles which are carried out by the pump to supply operating medium to the second metering unit in conjunction with the introduction of the third specified quantity of operating medium by the second metering unit, and/or the number of pumping cycles which are carried out by the pump to supply operating medium to the first metering unit in conjunction with the introduction of the first specified quantity of operating medium by the first metering unit in relation to the first specified quantity compared with the number of pumping cycles which are carried out by the pump to supply operating medium to the second metering unit in conjunction with the introduction of the third specified quantity of operating medium by the second metering unit in relation to the third specified quantity.

According to one embodiment, the operating medium comprises a liquid for exhaust gas aftertreatment by way of selective catalytic reduction (SCR), in particular the operating medium is a liquid for exhaust gas aftertreatment by way of selective catalytic reduction (SCR), wherein the two metering units each introduce the operating medium into a line to conduct exhaust gases of the engine. An advantage of this is that, in the event of problems with the exhaust gas aftertreatment, the operability of the metering units can be checked in a technically simple manner.

According to one embodiment, the operating medium comprises water, in particular the operating medium is water, wherein the two metering units introduce the operating medium into a line to supply fuel to the engine of the motor vehicle. One advantage of this is that, when water is injected to cool the air for combustion in the engine, it is possible to check in a technically simple manner whether the specified quantity is also actually dispensed by the first metering unit. This increases the performance of the engine. It is also possible for the operating medium to comprise, as an alternative or in addition to water, an alcohol, e.g. ethanol and/or methanol.

According to one embodiment, the second metering unit is removed from the engine of the motor vehicle during the step of sending a control signal to the second metering unit to introduce the second specified quantity of operating medium. An advantage of this is that the second metering unit can be checked for operability in a technically particularly simple and reliable manner. Therefore, the operability of the metering system can be checked in a particularly reliable manner.

According to one embodiment, the step of detecting the quantity of operating medium actually dispensed by the second metering unit is carried out by way of the quantity of operating medium dispensed by the second metering unit being directly measured. One advantage of this is that the quantity of operating medium actually dispensed can be detected or determined in a particularly accurate manner. Therefore, the second metering unit can be checked in a particularly reliable manner. In particular, the quantity of operating medium actually dispensed by the second metering unit can be determined by way of the quantity of operating medium introduced by the second metering unit being collected and measured.

According to one embodiment, the method is carried out when a fault message of the metering system is present. An advantage of this is that the first metering unit is checked when a fault has occurred. Therefore, unnecessary checking is prevented.

According to one embodiment, the steps of sending the control signal to the second metering unit to introduce the third specified quantity of operating medium, detecting the drop in pressure in the operating medium in the metering system owing to the introduction of the third specified quantity of operating medium and/or the number of pumping cycles which are carried out by the pump to supply operating medium to the second metering unit in conjunction with the introduction of the third specified quantity of operating medium by the second metering unit, sending the control signal to the second metering unit to introduce the second specified quantity of operating medium, detecting the drop in pressure in the operating medium in the metering system by the execution of the control signal to introduce the first specified quantity of operating medium by the first metering unit and/or the number of pumping cycles which are carried out by the pump to supply operating medium to the first metering unit in conjunction with the introduction of the first specified quantity of operating medium by the first metering unit, and comparing the drops in pressure or the drops in pressure in relation to the respectively specified quantity and/or the number of pumping cycles and/or the number of pumping cycles in relation to the respectively specified quantity are carried out during operation, in particular during driving operation, of the motor vehicle. One advantage of this is that the engine is warm during these checking steps, and therefore, in particular when the operating medium comprises a liquid for exhaust gas aftertreatment by way of selective catalytic reduction (SCR), possible damage to a catalytic converter is reliably prevented. Therefore, the method can be carried out in a particularly safe manner.

According to one embodiment, the first metering unit conveys or introduces the operating medium into a line upstream of a first catalytic converter and the second metering unit conveys or introduces the operating medium into a line upstream of a second catalytic converter. One advantage of this is that the metering units are therefore situated in locations which are particularly advantageous for the exhaust gas aftertreatment. Therefore, in this way, it is possible to check whether a sufficient quantity, specifically the specified quantity, of operating medium is actually supplied to the respective catalytic converter via the respective metering unit.

A preferred operating medium is fuel. It is likewise conceivable for the technology disclosed here to be used for storing other liquids (e.g. water or an aqueous solution) in a motor vehicle. Therefore, even though an operating medium tank, operating medium pump and the like are mentioned here, the terms fuel tank and fuel pump are likewise intended to be disclosed as well.

The metering unit can comprise or be an injection nozzle. The metering system can comprise or be an injection system.

The technology disclosed here relates, inter alia, to an operating medium tank which forms the storage volume for storing the operating medium. The operating medium tank therefore forms the substantially fluid-tight outer sleeve of the storage volume and delimits the storage volume from the installation space. In the case of plastic tanks, the term bubble is used for example. In the case of steel tanks, the operating medium tank can be formed, for example, from two metal shells. The operating medium tank can advantageously have a saddle shape comprising a main chamber and a secondary chamber which are connected to one another via a connecting region.

In other words, the technology disclosed here relates to a method in which a conclusion can be drawn about the behavior of the second metering unit (second injector) by way of comparison of pressure stages or the number of pumping cycles of two metering units of a hydraulically connected metering system when measuring one of the two metering units (injectors).

The number of metering units can also be more than two, e.g. three metering units, four metering units or six metering units.

The technology disclosed here will now be explained with reference to the figures.

DETAILED DESCRIPTION OF THE DRAWINGS

Figure 1:
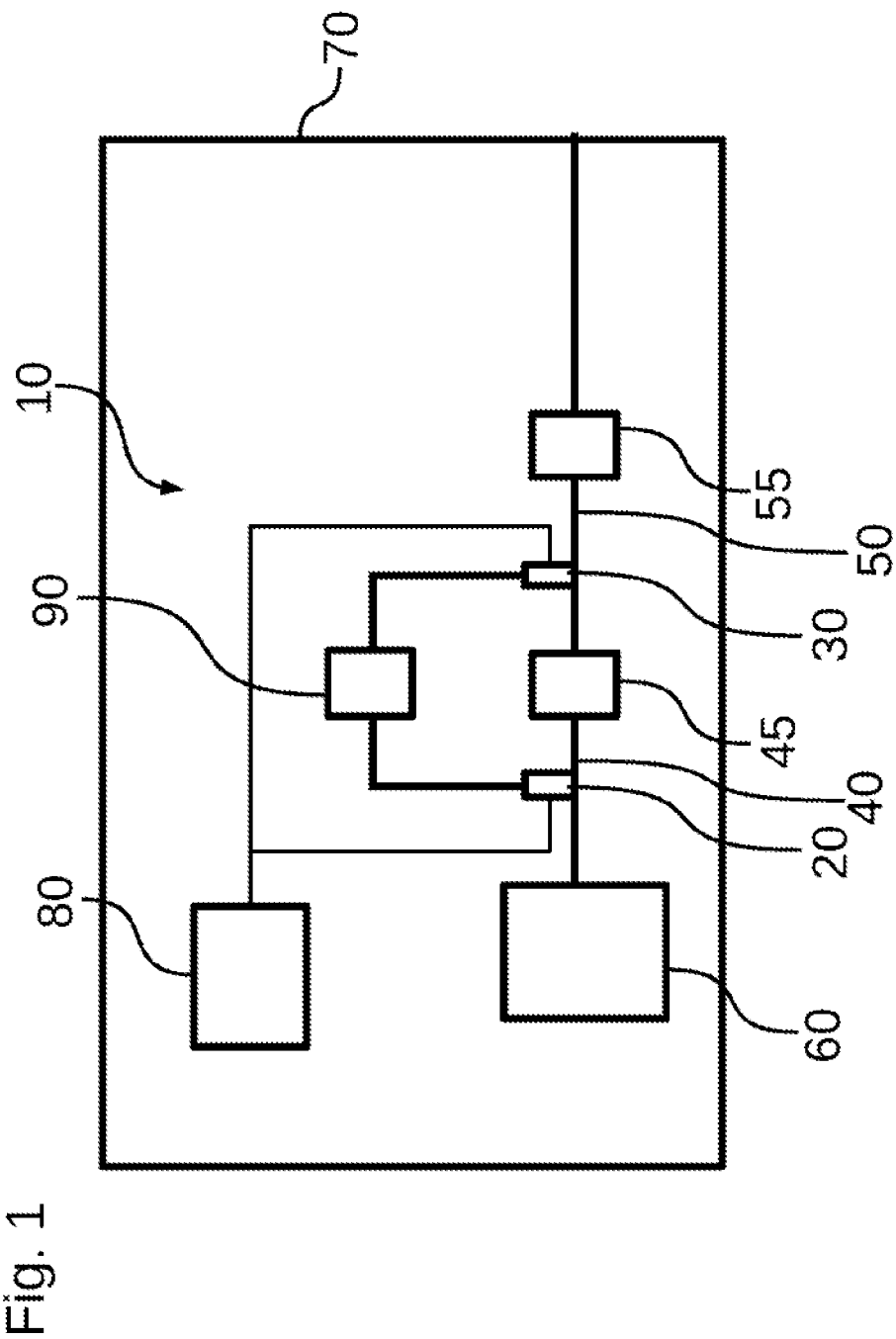
FIG. 1 shows a schematic view of a motor vehicle having a checking device according to the technology disclosed here.

FIG. 1 shows a schematic view of a motor vehicle 70 having a checking device 80 according to the technology disclosed here.

The motor vehicle 70 has a metering system 10, wherein the metering system 10 has a first metering unit 20 (e.g. first injector or first injection nozzle) and a second metering unit 30 (second injector or second injection nozzle). The metering units 20, 30 are designed to inject or introduce an operating medium. The injection nozzle can inject the operating medium into a line of the motor vehicle 70 and/or into a combustion chamber of an engine of the motor vehicle. The operating medium is arranged or stored in an operating medium tank 90 in the motor vehicle 70.

The operating medium can comprise a liquid for exhaust gas aftertreatment by way of selective catalytic reduction (SCR). In particular, the operating medium can comprise or be AdBlue® or an aqueous urea solution. The operating medium tank 90 can comprise or consist of, e.g., injection-molded HDPE.

The motor vehicle 70 has a checking device 80 for checking the operability of the metering system 10 or the first metering unit 20.

The first metering unit 20 is arranged close to an engine 60 of the motor vehicle 70. The first metering unit 20 is arranged between the engine 60 and a first catalytic converter 45. The second metering unit 30 is arranged between the first catalytic converter 45 and a second catalytic converter 55. The second metering unit 30 can be arranged in an underfloor region of the engine 60 or the engine compartment.

The metering units 20, 30 convey or introduce operating medium into a line 40, 50 in which the exhaust gases of the engine 60 are transported or routed. The line 40, 50 can run transversely to the direction of travel of the motor vehicle 70. The engine 60 can be installed transversely to the direction of travel.

The checking device 80 can actuate the respective metering unit 20, 30 using a control signal in order to in each case convey or introduce or dispense a specified quantity of operating medium. The control signal can indicate, e.g., the length of time for which the metering unit 20, 30 or the injection nozzle is open.

The first metering unit 20 and the second metering unit 30 are typically fluidically connected to one another.

The first metering unit 20 is usually situated in a position from which it can be removed only with difficulty or in a complicated manner. Therefore, the first metering unit 20 is checked by way of the second metering unit 30. This can be carried out in an intrusive manner, i.e. when a corresponding fault or fault input is present. A fault in the metering system 10 may be present, for example, when the difference in the drop in pressure during conveying or introduction or during injection lies above a specified value in both metering units 20, 30. Although it is then possible to establish that one reason for the fault message can be that one of the metering units 20, 30 is not operating correctly, it is unclear whether this is the reason for the fault message and which metering unit 20, 30 may be defective.

First of all, the second metering unit 30 is removed from the engine 60. A control signal for dispensing a second specified quantity of operating medium or liquid is passed to the second metering unit 30. The quantity of operating medium actually dispensed by the second metering unit 30 is detected and measured here. This can be done, e.g., by collecting the operating medium conveyed or dispensed by the second metering unit 30 and measuring the quantity of operating medium collected.

The second specified quantity and the quantity of operating medium actually conveyed or dispensed are compared with one another in order to establish whether the second metering unit 30 is operating correctly. The second metering unit 30 is operating correctly when the difference between the second specified quantity and the quantity actually conveyed or dispensed by the second metering unit 30 lies below a specified value (e.g. less than 10%, in particular less than 8%, preferably less than 5% or 2% of the first specified quantity).

However, it is also conceivable for these steps to be carried out while the second metering unit 30 remains installed in the engine 60.

The second metering unit 30 is then re-installed into the motor vehicle 70 at the original location. A respective control signal is then passed to the first metering unit 20 and to the second metering unit 30 in order to convey or introduce or dispense into the line 40, 50 a first specified quantity or a third specified quantity of operating medium.

The second specified quantity can be equal to the first specified quantity. However, it is also conceivable for the second specified quantity to be greater than the first specified quantity or less than the first specified quantity.

The third specified quantity can be equal to the second specified quantity. However, it is also possible for the second specified quantity to differ from the third specified quantity.

In each case, the drop in pressure or pressure difference in the metering system 10 is detected at the first metering unit 20 and at the second metering unit 30 during conveying or introduction.

By comparing the drops in pressure or the drops in pressure relative to the first specified quantity or third specified quantity in the metering system 10 or at the two metering units 20, 30, it is possible to establish whether the quantity actually introduced by the first metering unit 20 corresponds to the quantity which should have been introduced by way of the control signal from the first metering unit 20 (this is the first specified quantity).

If the difference between the drops in pressure lies below a specified value (e.g. less than 10%, less than 8% or less than 3% or 1.5% of the higher value), it is established that the first metering unit 20 is operating correctly. If the difference is equal to the specified value or lies above the specified value, it is established that the first metering unit 20 is not operating correctly. This can be indicated by a warning message and/or fault message. The first metering unit 20 can then be replaced or repaired.

The steps following the re-installation of the second metering unit 30 can be carried out during normal driving operation of the motor vehicle 70, in particular when the engine 60 is warm or the temperature of the engine 60 has exceeded a specified minimum temperature.

The checking device 80 is designed to execute the method described above.

The drops in pressure owing to the two metering devices 20, 30 can take place alternately (i.e. the metering devices 20, 30 are actuated alternately) or can take place or be detected cumulatively for each metering device 20, 30 within a specified time period.

In the following description of the alternative exemplary embodiment illustrated in FIG. 2, identical reference signs are used for features which are of identical and/or at least comparable configuration and/or manner of operation in comparison to the first exemplary embodiment which is illustrated in FIG. 1. If these are not explained in detail once again, the configuration and/or manner of operation thereof correspond/corresponds to the configuration and/or manner of operation of the features already described above.

Figure 2:
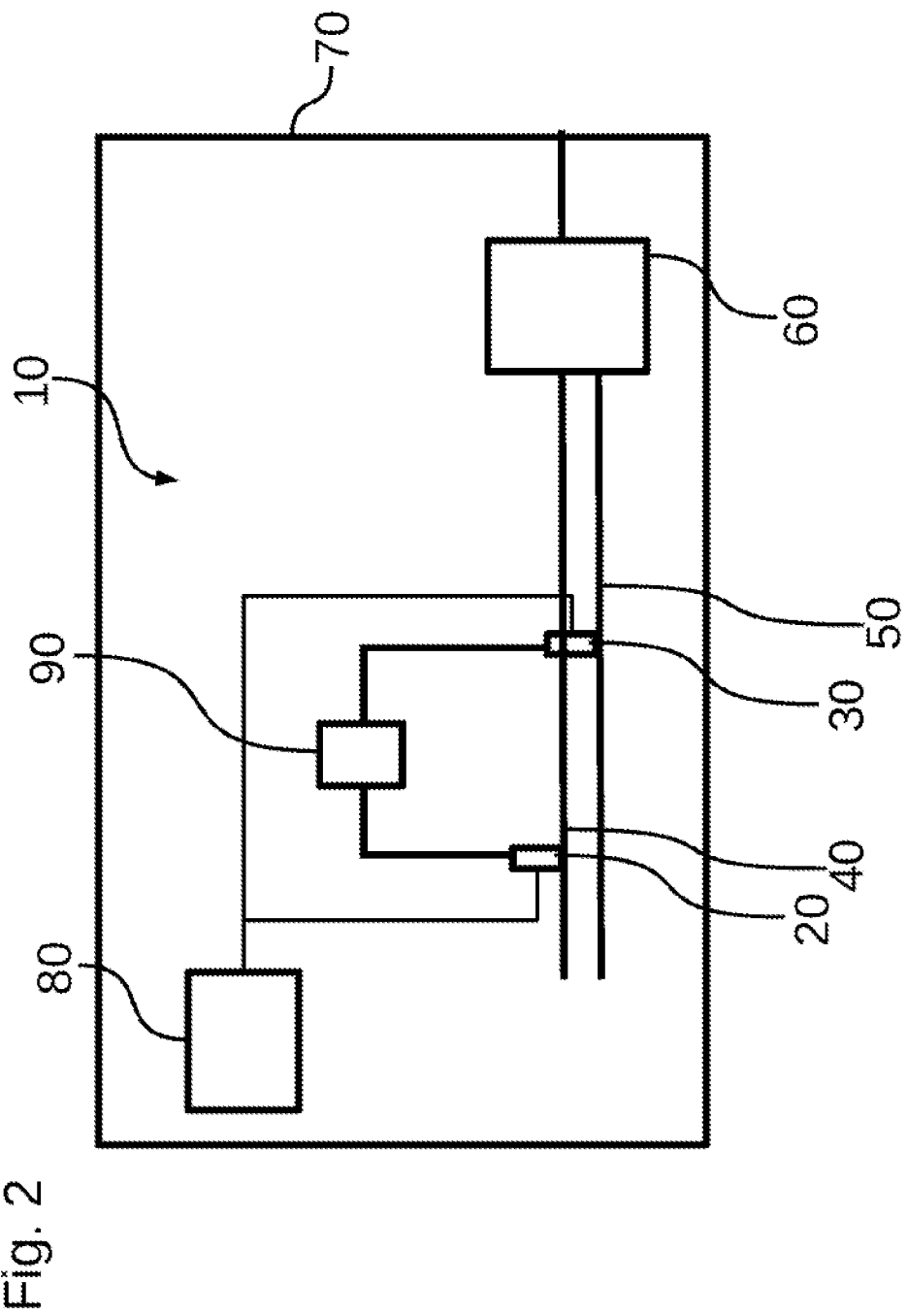
FIG. 2 shows a schematic view of a further motor vehicle having a checking device according to the technology disclosed here.

FIG. 2 shows a schematic view of a further motor vehicle 70 having a checking device 80 according to the technology disclosed here. The embodiment shown in FIG. 2 differs from the first embodiment of FIG. 1 in that the operating medium in the second embodiment comprises or is water and/or methanol and/or ethanol and that the metering units 20, 30 are arranged in such a way that the operating medium is conveyed or introduced into a first line 40 by way of the first metering unit 20 and into a second line 50 by way of the second metering unit 30, wherein the two lines 40, 50 each supply fuel to the engine 60.

Owing to the injection of water, the power of the engine 60 can be increased and/or generation of undesired exhaust gases during combustion can be reduced.

It is also conceivable for the metering units 20, 30 to inject or introduce the operating medium directly into the combustion chamber of the engine 60 of the motor vehicle 70. It is also possible for one or both metering units 20, 30 to add the operating medium to the fuel (DWI).

It is also possible that, instead of or in addition to the drops in pressure or the standardized drops in pressure, the number of pump cycles or the standardized pump cycles or the standardized number of pumping cycles are compared.

After the operability of the second metering unit 30 is checked, as described above, the number of pump cycles during the introduction of the first specified quantity and the third specified quantity is detected. A pump typically supplies the first metering unit 20 and the second metering unit 30.

A control signal to introduce the first specified quantity by the first metering unit 20 is sent to the first metering unit 20. The number of pumping cycles during the introduction of the first specified quantity is detected or counted.

A control signal to convey the third specified quantity is then sent to the second metering unit 30. The number of pumping cycles during the introduction of the third specified quantity is detected or counted.

The number of pumping cycles during the introduction of the first specified quantity by the first metering unit 20 and during the introduction of the third specified quantity by the second metering unit 30 is then compared. This can be carried out, in particular, when the first specified quantity is equal to the third specified quantity.

If the difference between the values which are compared with one another corresponds at least to a specified value or is greater than or equal to the specified value, it is established that the first metering unit 20 is not fully operable. If the difference lies below the specified value, it is established that the first metering unit 20 is fully operable.

It is also possible for the number of pumping cycles to be set in relation to the respective specified quantity (so-called standardized number of pumping cycles). If the first specified quantity differs from the third specified quantity, it is typically not the number of pumping cycles directly but rather the ratio of the number of pumping cycles to the respectively specified quantity that is compared. If the difference between the number of pumping cycles in relation to the respective specified quantity corresponds at least to a specified value, it is established that the first metering unit 20 is not fully operable. If the difference between the numbers of pumping cycles in relation to the respective specified quantity lies below the specified value, it is established that the first metering unit 20 is fully operable. For example, the third specified quantity can be twice the size of the first specified quantity. If the pump requires or executes twice as many pumping cycles during the introduction of the third specified quantity as during the introduction of the first specified quantity, the first metering unit 20 is fully operable.

The pump can be pressure-controlled, i.e. the pump conveys operating medium when the pressure has dropped, specifically until a specified pressure has been re-established in the metering system.

The control unit can be configured or formed by way of software functions in the controller of the motor vehicle 70.

For reasons of readability, the expression "at least one" has been omitted in parts for the sake of simplicity. If a feature of the technology disclosed here is described in the singular or with an indefinite article (e.g. the/a checking device 80, the/a metering system 10, the/a operating medium tank 90 etc.), its plural is also intended to be disclosed at the same time (e.g. the at least one checking device 80, the at least one metering system 10, the at least one operating medium tank 90 etc.).

In the context of the technology disclosed herein, the term "substantially" (e.g. "substantially vertical axis") comprises in each case the precise property or the precise value (e.g. "vertical axis") and in each case insignificant deviations for the function of the property/the value (e.g. "tolerable deviation from a vertical axis").

The preceding description of the present invention serves merely for illustrative purposes and not for the purpose of restricting the invention. Within the context of the invention, various amendments and modifications are possible without departing from the scope of the invention and its equivalents.

LIST OF REFERENCE SIGNS

10 Metering system
20 First metering unit
30 Second metering unit
40 First line
45 First catalytic converter
50 Second line
55 Second catalytic converter
60 Engine
70 Motor vehicle
80 Checking device
90 Operating medium tank

The invention claimed is:

1. A method for checking operability of a first metering unit for introducing an operating medium into a first line and/or into a combustion chamber of an engine of a motor vehicle, wherein the first metering unit is part of a metering system, and the metering system further comprises a second metering unit for introducing the operating medium into a second line and/or into the combustion chamber of the engine, the method comprising:

sending a second control signal to the second metering unit to dispense a second specified quantity of the operating medium;

detecting a quantity of the operating medium actually dispensed by the second metering unit in response to the second control signal to dispense the second specified quantity of the operating medium;

comparing the quantity of the operating medium actually dispensed by the second metering unit with the second specified quantity of the operating medium to check an operability of the second metering unit;

sending a third control signal to the second metering unit to introduce a third specified quantity of the operating medium;

detecting a drop in pressure in the operating medium in the metering system owing to an introduction of the third specified quantity of the operating medium and/or a number of pumping cycles which are carried out by a pump to supply the operating medium to the second metering unit in conjunction with the introduction of the third specified quantity of the operating medium by the second metering unit;

sending a first control signal to the first metering unit to introduce a first specified quantity of the operating medium;

detecting the drop in pressure of the operating medium in the metering system owing to execution of the first control signal to introduce the first specified quantity of the operating medium by the first metering unit and/or the number of pumping cycles which are carried out by the pump to supply the operating medium to the first metering unit in conjunction with the introduction of the first specified quantity of the operating medium by the first metering unit; comparing values of:

the detected drop in pressure on account of the execution of the first control signal by the first metering unit to introduce the first specified quantity with the detected drop in pressure on account of the execution of the third control signal by the second metering unit to introduce the third specified quantity; and/or the detected drop in pressure on account of execution of the first control signal by the first metering unit to introduce the first specified quantity relative to the first specified quantity with the drop in pressure on account of the execution of the third control signal by the second metering unit to introduce the third specified quantity relative to the third specified quantity; and/or the number of pumping cycles which are carried out by the pump to supply the operating medium to the first metering unit in conjunction with the introduction of the first specified quantity of the operating medium by the first metering unit with the number of pumping cycles which are carried out by the pump to supply the operating medium to the second metering unit in conjunction with the introduction of the third specified quantity of the operating medium by the second metering unit; and/or the number of pumping cycles which are carried out by the pump to supply the operating medium to the first metering unit in conjunction with the introduction of the first specified quantity of the operating medium by the first metering unit in relation to the first specified quantity with the number of pumping cycles which are carried out by the pump to supply the operating medium to the second metering unit in conjunction with the introduction of the third specified quantity of the operating medium by the second metering unit in relation to the third specified quantity;

establishing that the first metering unit is not operating correctly if a difference between the values which are compared with one another lies above a specified limit value; and if the first metering unit is not operating correctly, providing a warning message and/or a fault message, and replacing and/or repairing the first metering unit.

2. The method according to claim 1, wherein:
the operating medium comprises a liquid for exhaust gas aftertreatment by selective catalytic reduction (SCR), and
each of the first metering unit and the second metering unit introduces the operating medium into the respective line to conduct exhaust gases of the engine.

3. The method according to claim 1, wherein:
the operating medium comprises water, and
the first metering unit and the second metering unit introduce the operating medium into the respective line to supply fuel to the engine of the motor vehicle.

4. The method according to claim 1, wherein the second metering unit is removed from the engine of the motor vehicle during the sending of the second control signal to the second metering unit to introduce the second specified quantity of the operating medium.

5. The method according to claim 1, wherein the detecting of the quantity of the operating medium actually dispensed by the second metering unit is carried out by way of the quantity of the operating medium dispensed by the second metering unit being directly measured.

6. The method according to claim 1, wherein the method is carried out when a fault message of the metering system is present.

7. The method according to claim 1, wherein:
the sending of the third control signal to the second metering unit to introduce the third specified quantity of the operating medium,
the detecting of the drop in pressure in the operating medium in the metering system owing to the introduction of the third specified quantity of the operating medium and/or the number of pumping cycles which are carried out by the pump to supply the operating medium to the second metering unit in conjunction with the introduction of the third specified quantity of the operating medium by the second metering unit,
the sending of the second control signal to the second metering unit to introduce the second specified quantity of the operating medium,
the detecting of the drop in pressure in the operating medium in the metering system by the execution of the first control signal to introduce the first specified quantity of the operating medium by the first metering unit and/or the number of pumping cycles which are carried out by the pump to supply operating medium to the first metering unit in conjunction with the introduction of the first specified quantity of the operating medium by the first metering unit, and
the comparing of the drops in pressure or the drops in pressure in relation to the respectively specified quantity and/or the number of pumping cycles and/or the number of pumping cycles in relation to the respective specified quantity,
are carried out during operation of the motor vehicle.

8. The method according to claim 1, wherein the first metering unit introduces the operating medium into the first line upstream of a first catalytic converter and the second metering unit introduces the operating medium into the second line upstream of a second catalytic converter.

9. A checking device for checking operability of a first metering unit of a metering system, wherein the metering system is configured to introduce an operating medium into a line and/or into a combustion chamber of an engine of a motor vehicle, and the metering system further comprises a second metering unit for introducing the operating medium into a second line and/or into the combustion chamber of the engine,
wherein the checking device is configured:
to send a third control signal to the second metering unit to introduce a third specified quantity of the operating medium,
to send a second control signal to the second metering unit to introduce a second specified quantity of the operating medium,
to detect a quantity of the operating medium actually dispensed by the second metering unit in response to the second signal to dispense the second specified quantity;
to compare the quantity of the operating medium actually dispensed by the second metering unit with the second specified quantity of the operating medium to check an operability of the second metering unit;
to detect a drop in pressure in the operating medium in the metering system owing to an execution of the third control signal to introduce the third specified quantity of the operating medium by the second metering unit and/or a number of pumping cycles which are carried out by a pump to supply the operating medium to the second metering unit in conjunction with the introduction of the third specified quantity of the operating medium by the second metering unit, to send a first control signal to the first metering unit to introduce a first specified quantity of the operating medium, to detect the drop in pressure in the operating medium in the metering system owing to an execution of the first control signal to introduce the first specified quantity of the operating medium by the first metering unit and/or the number of pumping cycles which are carried out by the pump to supply the operating medium to the first metering unit in conjunction with the introduction of the first specified quantity of the operating medium by the first mete ring unit, to compare values of:
   the detected drop in pressure on account of the execution of the first control signal by the first metering unit to introduce the first specified quantity with the detected drop in pressure on account of the execution of the third control signal by the second metering unit to introduce the third specified quantity; and/or
   the detected drop in pressure on account of the execution of the first control signal by the first metering unit to introduce the first specified quantity relative to the first specified quantity with the detected drop in pressure on account of the execution of the third control signal by the second metering unit to introduce the third specified quantity relative to the third specified quantity; and/or
   the number of pumping cycles which are carried out by the pump to supply the operating medium to the first metering unit in conjunction with the introduction of the first specified quantity of the operating medium by the first metering unit with the number of pumping cycles which are carried out by the pump to supply the operating medium to the second metering unit in conjunction with the introduction of the third specified quantity of the operating medium by the second metering unit; and/or
   the number of pumping cycles which are carried out by the pump to supply the operating medium to the first metering unit in conjunction with the introduction of the first specified quantity of the operating medium by the first metering unit in relation to the first specified quantity with the number of pumping cycles which are carried out by the pump to supply the operating medium to the second metering unit in conjunction with the introduction of the third specified quantity of the operating medium by the second metering unit in relation to the third specified quantity, and to establish that the first metering unit is not operating correctly if a difference between the values which are compared with one another lies above a specified limit value.

10. A motor vehicle comprising the checking device according to claim 9.

\* \* \* \* \*